США006218956B1

United States Patent
Davis et al.

(10) Patent No.: US 6,218,956 B1
(45) Date of Patent: *Apr. 17, 2001

(54) GATE OPERATOR WITH REMOTE DIAGNOSTIC CAPABILITY

(75) Inventors: William R. Davis, La Canada; John Hansen, Moorpark; John F. Ahlstrom, Chatsworth; Ronald Arden Wray, Lake View Terrace; Richard P. Greenthal, Beverly Hills, all of CA (US)

(73) Assignee: The Chamberlain Group, Inc., Elmhurst, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,743

(22) Filed: Aug. 27, 1997

Related U.S. Application Data

(60) Provisional application No. 60/024,429, filed on Aug. 28, 1996.

(51) Int. Cl.[7] .................................................. G06F 15/20
(52) U.S. Cl. ............................... 340/825.31; 340/825.69; 340/825.72; 340/500; 49/31
(58) Field of Search ......................... 340/825.31, 825.34, 340/825.69, 825.72, 825.37, 545, 426; 49/24, 26, 31, 32

(56) References Cited

U.S. PATENT DOCUMENTS

| 4,365,250 | * | 12/1982 | Matsuoka et al. | 340/825.32 |
|---|---|---|---|---|
| 4,887,078 | * | 12/1989 | Cho | 340/825.48 |
| 4,897,630 | * | 1/1990 | Nykerk | 340/426 |
| 5,565,843 | * | 10/1996 | Meyvis | 340/545 |
| 5,751,224 | | 5/1998 | Fitzgibbon | 340/825.22 |

OTHER PUBLICATIONS

U.S. Application No. 09/023,948, filed Feb. 13, 1998, which is a continuation of U.S. Application No. 08/467,309, filed Jun. 6, 1995, now abandoned.

* cited by examiner

*Primary Examiner*—William A Cuchlinski, Jr.
*Assistant Examiner*—Yonel Beaulieu
(74) *Attorney, Agent, or Firm*—Fitch, Even, Tabin & Flannery

(57) ABSTRACT

A movable barrier operator system includes a barrier-motor electrical driver, a first input device for receiving operating commands, a second input device for developing system status and a controller for storing a record of all input commands received and a record of all events occurring to the movable barrier and for enabling operation of the electrical driver in response to an input command. The first input device may be a DTMF receiver or a telephone entry system. Events stored include barrier obstructions and barrier operator failures. The controller, responsive to a stored event, enable the telephone entry system to contact a service provider. For facilities with multiple barriers and a DTMF receiver at each operator, a special circuit normalizes the amplitude of a transient analog tone burst (such as from a DTMF transmission) without any transient level overshoot.

9 Claims, 17 Drawing Sheets

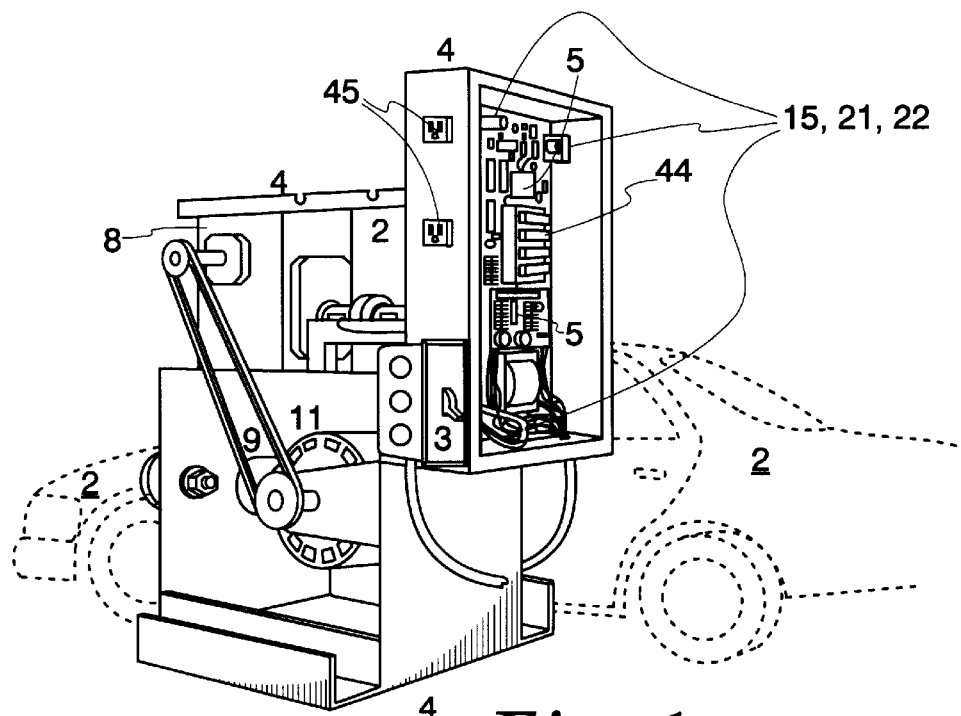
Fig. 1
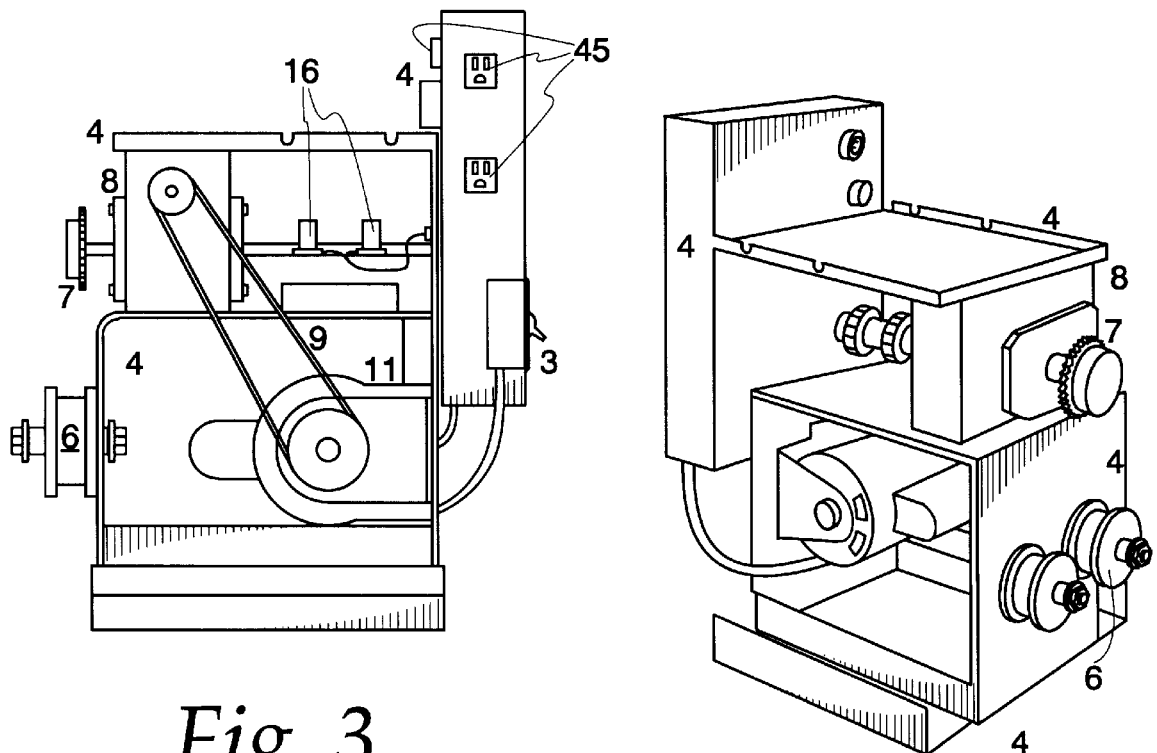
Fig. 3
Fig. 2

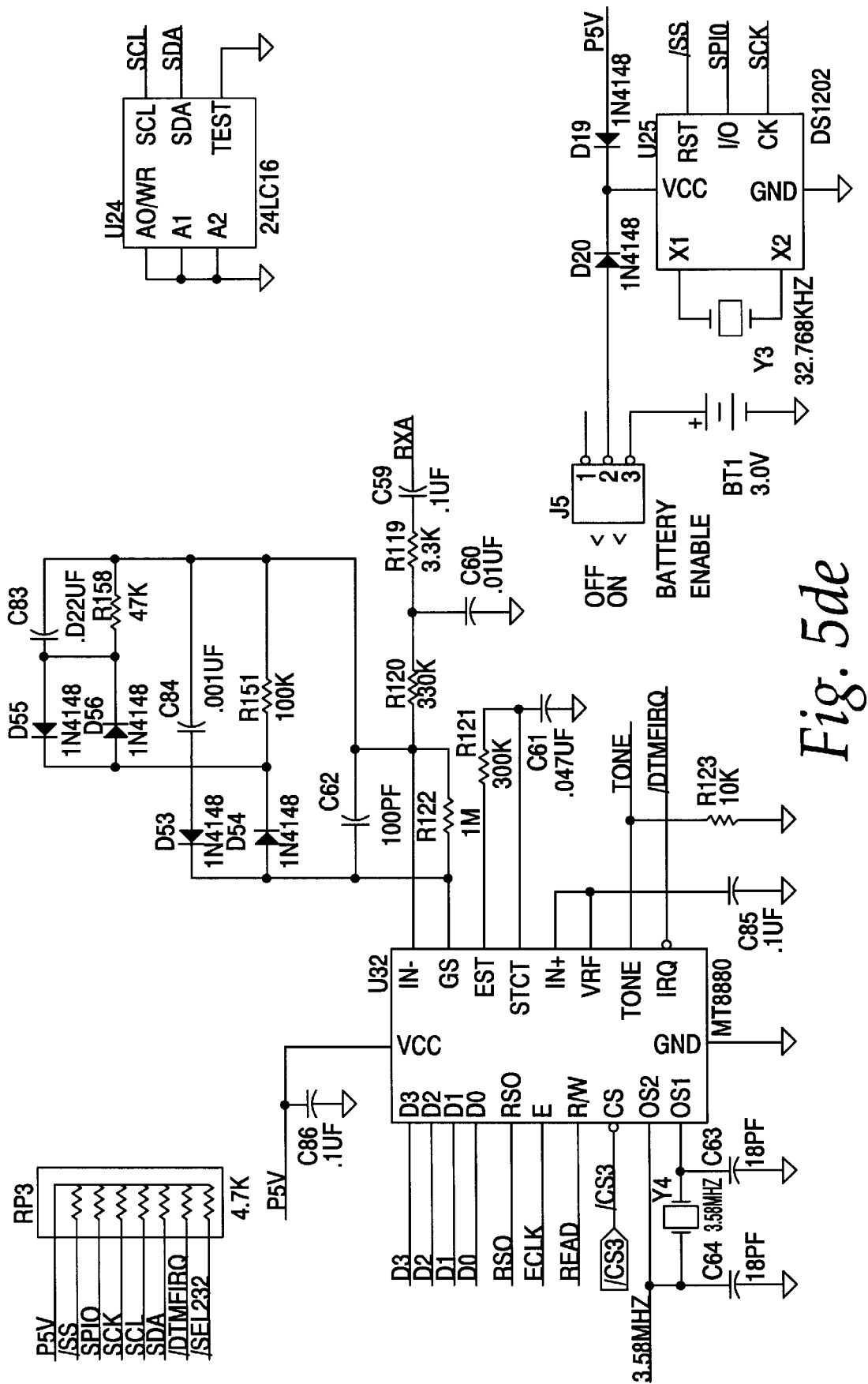

GATE OPERATOR WITH REMOTE DIAGNOSTIC CAPABILITY

RELATED PATENT DOCUMENTS

This is a continuation of coowned and copending U.S. provisional utility-patent application Ser. No. 60/024,429, filed on Aug. 28, 1996. Other related patent documents—although in a distinctly different field from that of the present invention—include coowned U.S. Pat. Nos. 5,027,111, 5,252,955, 5,416,495, and 5,475,741. All of the foregoing are fully incorporated herein by reference.

BACKGROUND

1. Field of the Invention

This invention relates generally to automatic equipment for operating gates, and also to systems incorporating such equipment and such gates; and more particularly to computer-controlled apparatus enabling both remote diagnosis and automatic remote alerting of service personnel to actual or incipient failure.

2. Related Art

Gate operators have been in use for many years. They are the devices that provide the motive force for opening a security gate to a residence or a complex facility.

A gate operator typically includes an electric motor, gearbox and drive mechanism, and an electronic controller. It opens a gate in response to any of a variety of inputs (typically contact closures), such as that from a receiver in response to a transmitter being activated, or an input from a card or code entry system when a valid card or code is used, or that from a telephone entry system when a resident is granting access to a visitor. Some such systems that have been connected to activate gate operators—but previous to our present invention have never been otherwise integrated with such operators—are the subjects of our above-mentioned patents.

Because they are outdoors and subjected to constant use, from time to time gate operators fail. Moreover, because of built-in safety features their operation may be interrupted, giving the appearance of a failure. For instance an operator may shut itself down and require resetting because of fault conditions such as motor overcurrent (occurring through, for instance, some blockage of the gate or of moving parts in the operator itself, or through exhaustion of lubrication), or seeming failure of the gate to close (occurring through, for instance, chain failure or malfunction of a position detector). Such appearance can also arise through improper use.

Because gate operators may control access to large complexes or gated communities, their actual or apparent failure can be extremely disruptive. This is especially true if such an event is protracted.

Heretofore it has been possible to determine the cause of a gate-operator failure only by going to the site where the operator is installed. Thus, all seeming failures—including those that aren't really failures (e.g., activation of a safety device, or improper use of the gate system or peripheral systems)—necessarily cause a service call.

Even then, and even after ascertaining the problem, if in fact it is a true failure a service technician may not be able to fix it. The technician may not have brought along all the necessary parts for the particular gate, the particular gate-operator model, or the particular installation geometry, because, before arriving, the technician may have had little idea of the failure mode.

Actual or apparent failures can also be intermittent. (This is especially true of gate operators because they have moving parts which can be slightly out of adjustment.) After a customer has called the service technician complaining of a problem, the technician arrives only to find the gates working properly. This intermittent type of failure can make trouble-shooting almost impossible and can lead to many successive service calls—and in turn to a great deal of contention between the customer and the servicing company.

Still another difficulty with prior automatic gate operators is the scheduling of preventive maintenance. Because the number of cycles of opening and closing per day or week varies greatly between different types of installations, a service technician arriving for routine service may find that no service is really needed—or, conversely, a service technician arriving on an urgent service call may find that significant down time could have been avoided by renewal of lubrication or consumable parts a week or two before.

Two other type of devices which are relevant to our present invention, though in markedly different arts, are the modern telephone entry system—such as those described in our above-mentioned patents—and access control systems with card and code capability. Telephone entry systems incorporate the ability to be called and diagnosed remotely via modem; and access control systems provide various automatic functions that conceptually overlap with those of gate operators.

Heretofore, we believe, it has never been suggested that there might be any relationship between the features of such entry or access systems and the problems of automatic gate operators—even though the three types of systems have coexisted side by side (and in many installations even interconnected) for years, and even though enormous benefits could have flowed from such a recognition. A possible reason for the failure of workers in any of these arts to recognize this potential is that gate operators have always been primarily electromechanical devices with rudimentary electronic control.

As can now be seen, the related art remains subject to significant problems, with room for major improvements.

SUMMARY OF THE DISCLOSURE

The present invention introduces such improvements. Our invention enables a service technician to diagnose the cause of failure of a gate operator remotely, before traveling to the site.

Doing so sometimes precludes a service call altogether if, for example, it is ascertained that improper use or a safety feature caused the failure. If a service call is in fact necessary, the service technician usually knows which repair parts to bring along, thereby ordinarily preventing a follow-up service call.

Moreover, our invention preferably enables the gate operator itself to automatically call a preprogrammed number (such as the service technician's beeper) when the operator has a problem, thereby allowing the operator to be fixed as soon as possible. The gate operator also preferably can call that number when preventive maintenance is required (e.g., after a certain number of open/close operations).

Our invention makes a record of gate-operator operating commands and events. Preferably this record is available to a technician by remote transmission, enabling a technician to make an excellent assessment of the situation before going to the installation. The record, however, is of great value not only at that time but also even after a technician has reached the site, and even if no preliminary remote contact was made, since in difficult cases (e.g. intermittent failures) the technician may then wish to compare what he sees with relatively extensive amounts of the data in the record.

The foregoing operational principles and advantages of the present invention will be more fully appreciated upon consideration of the following detailed description, with reference to the appended drawings, of which:

BRIEF DESCRIPTION OF THE DRAWINGS

FIG. 1 is a perspective view, taken from the right front, of an automatic gate operator, including the controller, in accordance with a preferred embodiment of our invention—and for orientation also showing portions of an automobile such as might be passing through an associated gate (not shown);

FIG. 2 is a like view of the FIG. 1 operator but taken from the left rear;

FIG. 3 is a like of the same operator taken from the front;

DETAILED DESCRIPTION OF THE PREFERRED EMBODIMENTS

Figure 4:
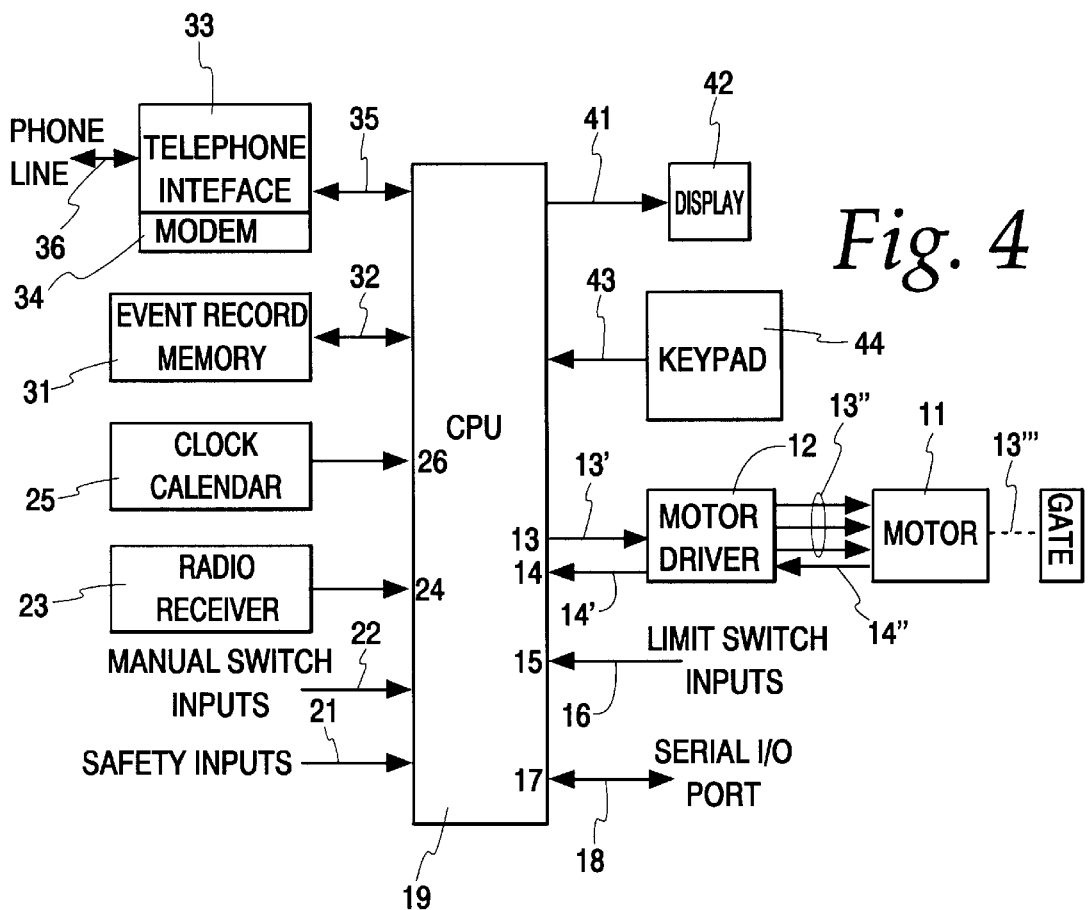
FIG. 4 is a functional block diagram of the electronic control of the FIG. 1 gate operator.

A gate operator for control of vehicle 2 passage according to preferred embodiments of our system includes a motor 11 (FIG. 1), belt drive 9, ninety-degree stepdown transmission 8, sprocket drive 7, chain 13'''(FIG. 4), and chain-suspension rollers 6. It also has a keypad 44, electronics 5, power-input and -output connectors 45, external-input connectors 15, 21, 22, chassis 4 and power switch 3.

Our invention internally records 31 (FIG. 4) all fault and alarm conditions 14', 14'', 18, 21 as well as normal system status (e.g., limit switches 16) and activity (e.g., opening by a transmitter 23). This event record can be retrieved remotely via modem 34 or DTMF tones by the servicing company. Thus, if the failure is intermittent the servicing company can see what it was, even after the condition no longer exists, since it was captured by the gate operator.

The event record can also help to unravel problems caused by a sequence of events rather than a single condition. Once again, since the diagnosis is often done before the service technician travels to the site, the technician can generally know what parts to bring along if, in fact, the failure is real and necessitated a physical service call.

Thus, our invention significantly facilitates the repair and service process and reduces its cost. It should also minimize those situations where an intermittency exists, confounding the troubleshooting process which could (absent the present invention) lead to enormous customer ill-will.

Our gate operator has an event record memory (ERM) 31 that keeps track of all system activity. The events to be automatically logged are merely those which an experienced service technician of ordinary skill in this field would enumerate, if asked what events cause actual or apparent failure; some of these have been mentioned earlier in this document, and some others are discussed below.

The operator also has a telephone interface 33 that allows the gate operator to be called, whereupon the ERM 31 can be viewed via modem 36 on a remote computer using a generally conventional telecommunications data-request program. The current status of the gate operator (e.g., open or closed) can also be determined via a tone phone, with the gate operator responding to tone commands from the remote phone with its own DTMF codes corresponding to different status conditions. The telephone interface also allows the gate operator to make an outgoing call to a preprogrammed number when a fault or alarm condition occurs or it is time to conduct preventive maintenance.

A system in accordance with the most highly preferred embodiment of the invention includes the following major elements.

CPU: This internal digital microprocessor 19 monitors all inputs 14', 14'', 15, 18, 21, 22, 24, 26, 32, 35, 43, controls all outputs 13', 32, 35, 41, and provides all system timing. It includes RAM, and EPROM and EEPROM for program storage.

KEYPAD: The twelve-key keypad 44 is used for local programming and status interrogation. It is used by installation and service personnel.

DISPLAY: This is a single digit, seven-segment visual display 42 used for local programming and status display. It is used by installation and service personnel.

EVENT RECORDING MEMORY: This is an EEPROM 31 that provides nonvolatile storage of all activity and conditions in the gate operator. Its main purpose is to store history for troubleshooting. Every entry has a time and date stamp, and can be accessed locally via a serial interface port 18 or remotely via the phone line etc. 36. Data in this memory are maintained even if power is shut 8 off.

CLOCK/CALENDAR: This block 25 maintains the time of day and the calendar. It will continue to operate from its own battery even if power is shut off. The clock/calendar is used to time stamp all activities in the event record memory and to control the automatic open/close schedules of the gate.

MANUAL INPUTS: These are the normal control inputs 22 to the gate operator. They include open, close, stop, fire open, exit request, etc. The inputs are typically contact closures.

RADIO RECEIVER: This block 23 receives signals from wireless code transmitters or modern equivalents and provides a signal to the CPU. It usually is used to generate an open command.

SAFETY INPUTS: These inputs 21 are used to provide safe mechanical operation of the gate. They are usually contact closures from safety loops, safety bars, etc.

MOTOR DRIVE: This block 12 provides power to the motor 11 for moving the gate. It allows controlled operation of the motor in both directions as well as a braking function. Both instantaneous and average motor current 14' are monitored as well as a check for open motor windings 14'', and any fault condition is reported to the CPU for safety control and recording in the event record memory.

LIMIT SWITCHES: These switches 22 define the limits of gate movement. They are used for full open or closed status and to terminate gate movement.

TELEPHONE INTERFACE: This block 33 controls the telephone line for both outgoing and incoming calls. In addition it includes or has associated a modem 34 for communication with a remote computer and DTMF circuits for communication with a remote telephone or pager.

Security protection against unauthorized incoming calls is provided by the use of a password. Authorized incoming calls will be answered and access provided to any input and the transaction buffer for troubleshooting.

Fault conditions such as mentioned in the BACKGROUND section of this document—motor overcurrent or failure of the gate to close—will generate an outgoing call to a predetermined telephone number. Status condition codes will be included in that call, along with a unique system identification based on a programmed number of gate operations, battery service required, time, etc.

SERIAL INTERFACE PORT: This port 18 provides input and output connections for a printer or computer. It allows local monitoring of the event recording memory.

Another aspect of our invention that creates further benefits is the ability to put several gate operators on one phone line, thus eliminating the costs associated with several phone lines. The zero-attack-time amplitude-normalizing circuit (FIG. 6) allows this while ensuring proper operation.

This innovation ensures proper DTMF levels required by gate operators sharing a telephone line. For example, adding gate operators to a phone line (absent this part of our invention) would typically reduce the level of incoming DTMF tones, possibly resulting in the automatic operators' not responding to DTMF commands.

The circuit provides a constant output-signal level to a DTMF detector, from a wide range of input-signal levels. It differs from AGC (Automatic Gain Control) circuits in that it is substantially waveform- and frequency-independent, and is instantaneous and continuous with no averaging. Thus in substance it acts immediately on the incoming signal.

Because our gate operator is microprocessor-based, has EEPROM memory, and is programmable, it can also include a wide variety of access control functions. For example, an external/remote keypad or card access can be integrated into the gate-operator electronics (FIG. 4) if preferred, rather than being handled by a separate access control system.

Similarly, individually coded transmitters and their receivers can be used without the need of a separate access control system. In fact, the receiver can be part of the gate operator controller board, as opposed to a separate device that must be connected to the gate operator controller board.

Thus, the design of our intelligent gate operator is such that it can be made into a complete, integrated access control system. Such a system can have significantly lower equipment costs than one which uses an access control system that is separate or partly separate from the gate operator.

Zero-attack-time amplitude-normalizing circuit—Dual-Tone MultiFrequency (DTMF) Detectors can reliably detect DTMF tone pairs over only a limited dynamic range of amplitudes. If more dynamic range is needed in an application, some form of volume compression or expansion, or both, must be used.

A conventional Automatic Gain Control (AGC) circuit is inadequate for purposes of the present invention, because such a circuit suffers undesirable transient overshoots on receipt of the sudden onset of energy in a DTMF tone burst. A conventional AGC circuit requires some time to recover from such amplitude transients, but DTMF signals are sent in bursts of undefined length—in some automatic dialing systems as short as sixty milliseconds.

Thus the required recovery time may approach the total duration of the tone burst to be detected, leaving the DTMF detector too little time to detect and debounce the signal. To circumvent this problem the present invention incorporates a novel circuit that normalizes the amplitude of a transient analog tone burst without any transient level overshoot.

This circuit makes analog detectors usable over a greater dynamic range of amplitude, and tolerant of transients that would not be attenuated by conventional Volume Compressors and Automatic Gain Controls. An operational amplifier U1A (FIG. 6) is used in the inverting configuration, with a negative-feedback primary resistor R2 and a parallel capacitor C1.

This configuration provides a maximum small-signal gain and the high-frequency roll-off desired. The small-signal gain is equal to the resistive value of the primary resistor R2 divided by the resistive value of a series input resistor R1.

Parameters for this portion of the circuit are selected so that the circuit satisfactorily handles the smallest DTMF signals anticipated—as, for example, with several different gate operators possibly on-line simultaneously so that DTMF tone amplitude at each operator is low. The remainder of this gain-normalization circuit deals with progressively larger signals.

The circuit capitalizes on the fact that, under low-current conditions, a diode's forward current conduction rises exponentially with applied voltage. Through connection of two silicon diodes in parallel with their polarities mutually opposed, the current rise in both directions can be made to increase exponentially.

This exponential forward increase in conduction, consistent with the changing voltage, can be used to produce a progressive turn-on of two or more different feedback-resistor paths. In other words, as input-signal amplitude increases such a circuit automatically switches in, or phases in, progressively different feedback characteristics.

For this purpose, a secondary negative feedback resistor R3 is also coupled to the operational amplifier U1A. This resistor is placed in series with two silicon diodes D1 and D2, which are connected in parallel with each other but with their polarities opposed. When the output-voltage excursions of the operational amplifier approach the threshold of the diodes' conduction, the diodes progressively connect the secondary resistor R3 in parallel with the primary-feedback resistor R2, thereby reducing the overall effective gain of the operational amplifier. Accordingly the circuit stabilizes DTMF output volume, at the circuit output "OUT", over two ranges of DTMF input volume.

A secondary feedback capacitor C2 is connected in parallel with the secondary negative feedback resistor R3. Its capacitance is calculated to interact with the feedback resistors R2, R3 which have been discussed above, in such a way as to maintain the desired frequency roll-off.

In addition a tertiary negative feedback resistor R4 is coupled to the operational amplifier and placed in series with two additional silicon diodes D3 and D4, connected in parallel but with their polarities opposed. These two parallel diodes are in series with the previously mentioned progressive-switching diodes D1 and D2, coupled to the tertiary feedback resistor.

As the output voltage excursions of the operational amplifier approach the additive threshold of both diode pairs' conduction, the diode pairs (D1–D2 and D3–D4) begin to function in electrical series. The tertiary resistor R4 is progressively connected in parallel with both the primary feedback and secondary feedback resistors, further reducing the overall gain of the operational amplifier—and stabilizing the output at the "OUT" terminal over three successive ranges of DTMF input volume (including, for instance, a situation in which perhaps only one or two gate operators are on line simultaneously).

A tertiary feedback capacitor C3 is connected in parallel with the tertiary resistor R4. Its capacitance is calculated to maintain the desired frequency roll-off.

Figure 6:
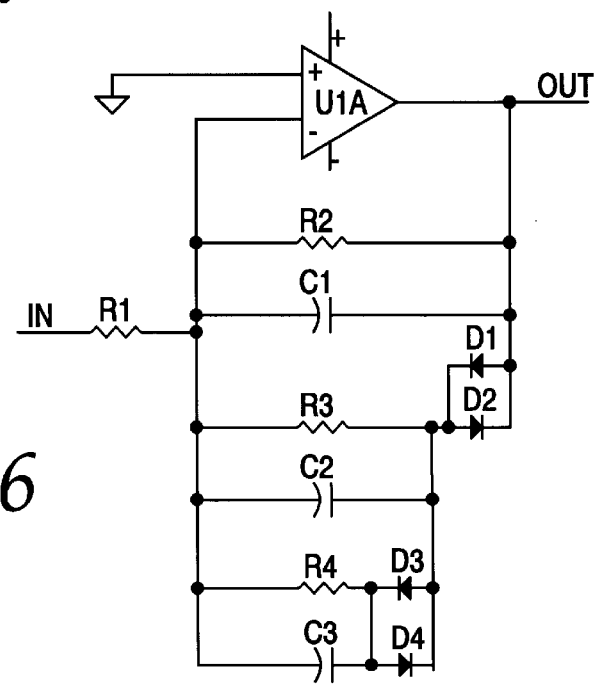
FIG. 6 is a schematic diagram of an amplitude-normalizing circuit used in the FIG. 4 control.
Figure 5A:
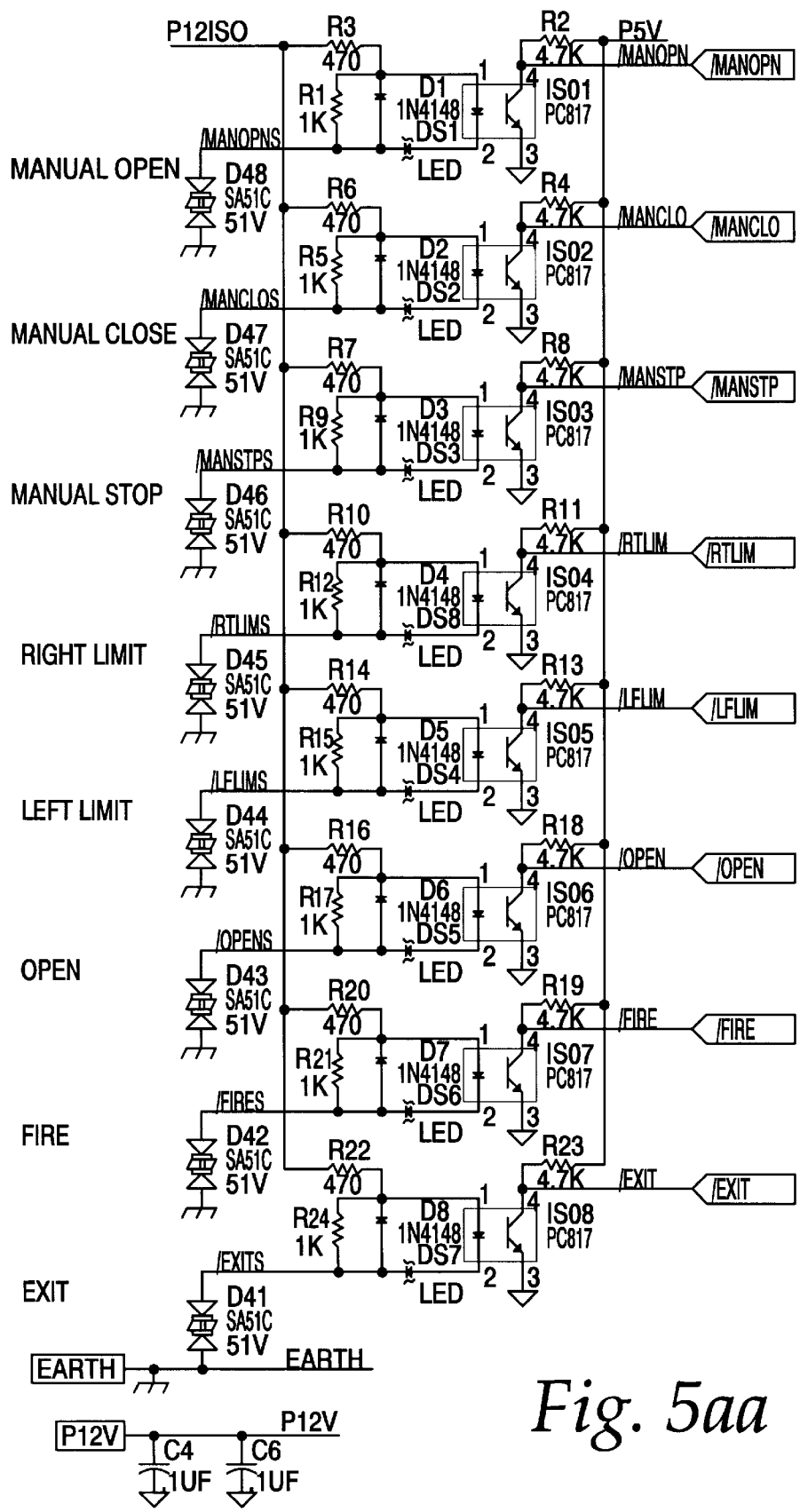
FIGS. 5a–d are detailed schematics (in several sheets) of the FIG. 4 electronic control.
Figure 5A:
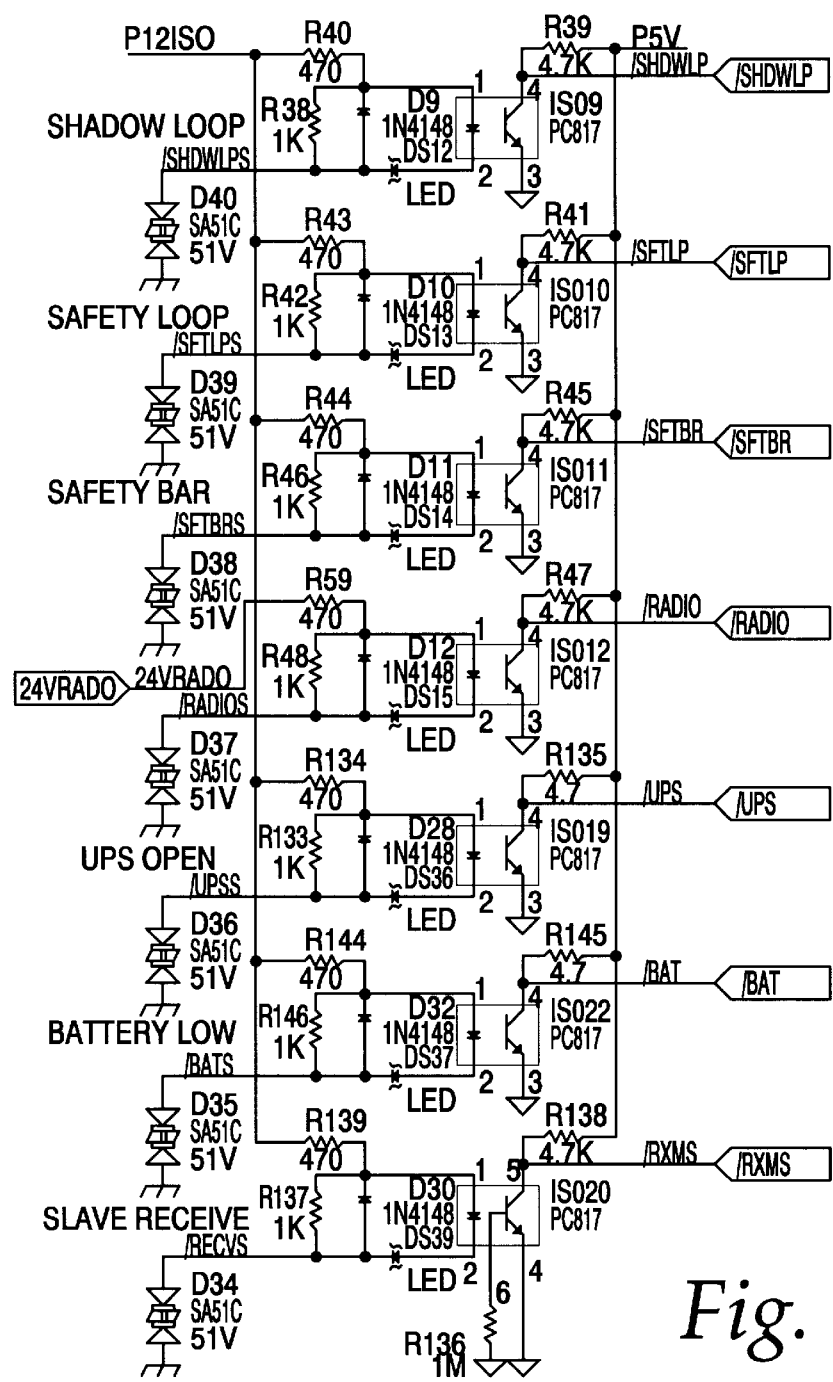
Figure 5A:
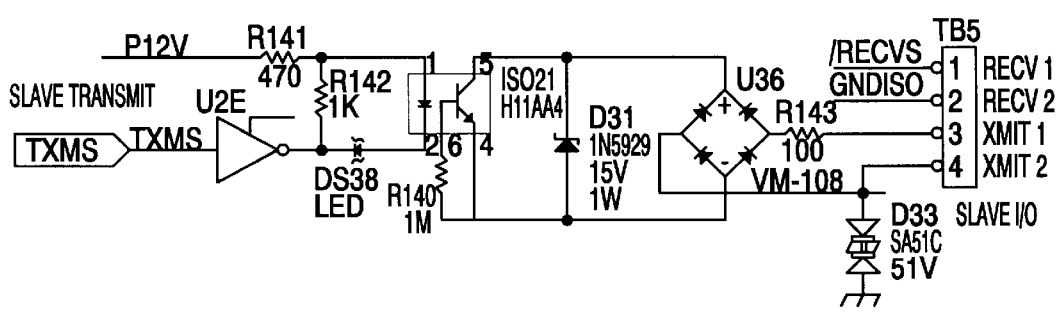
Figure 5A:
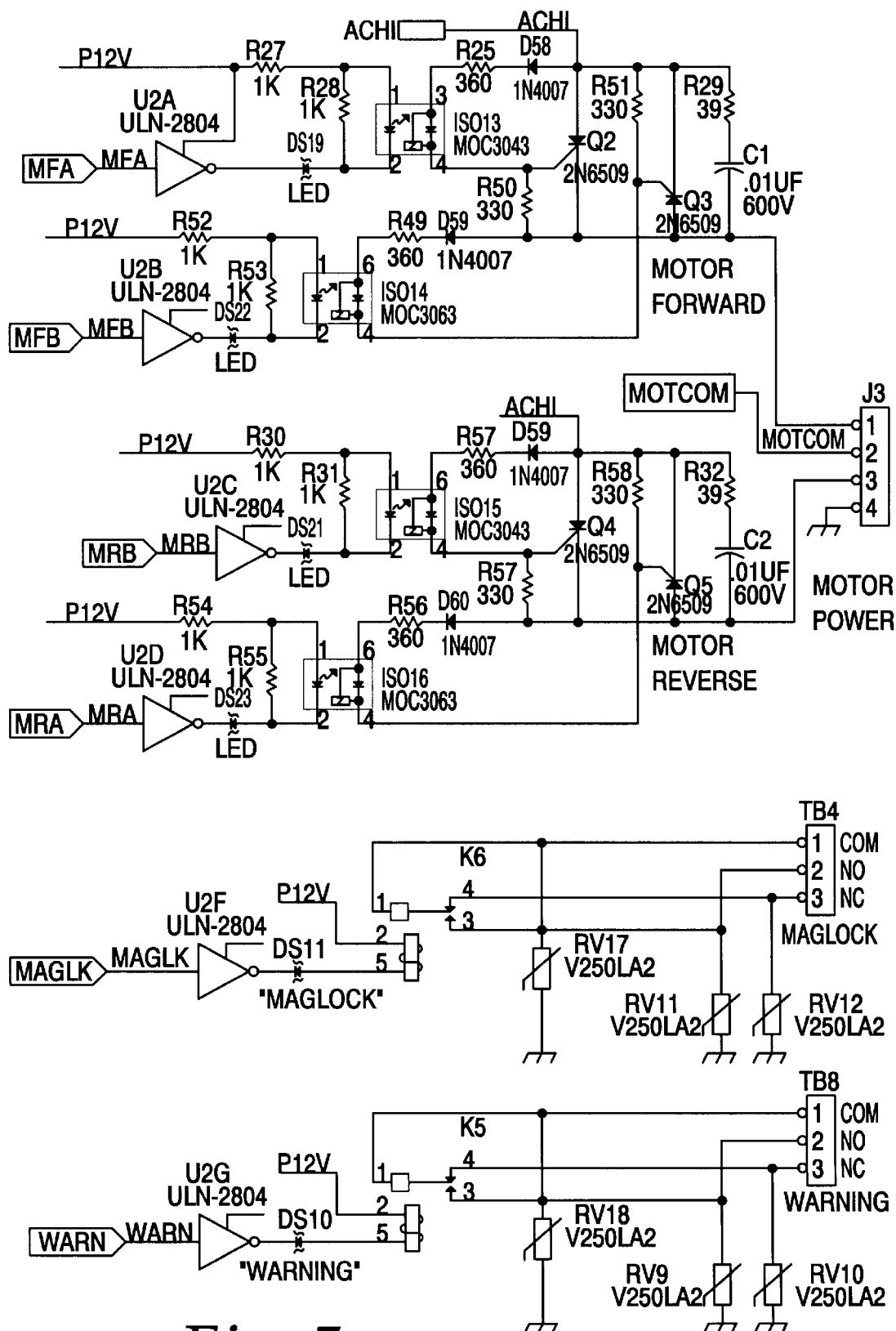
Figure 5A:
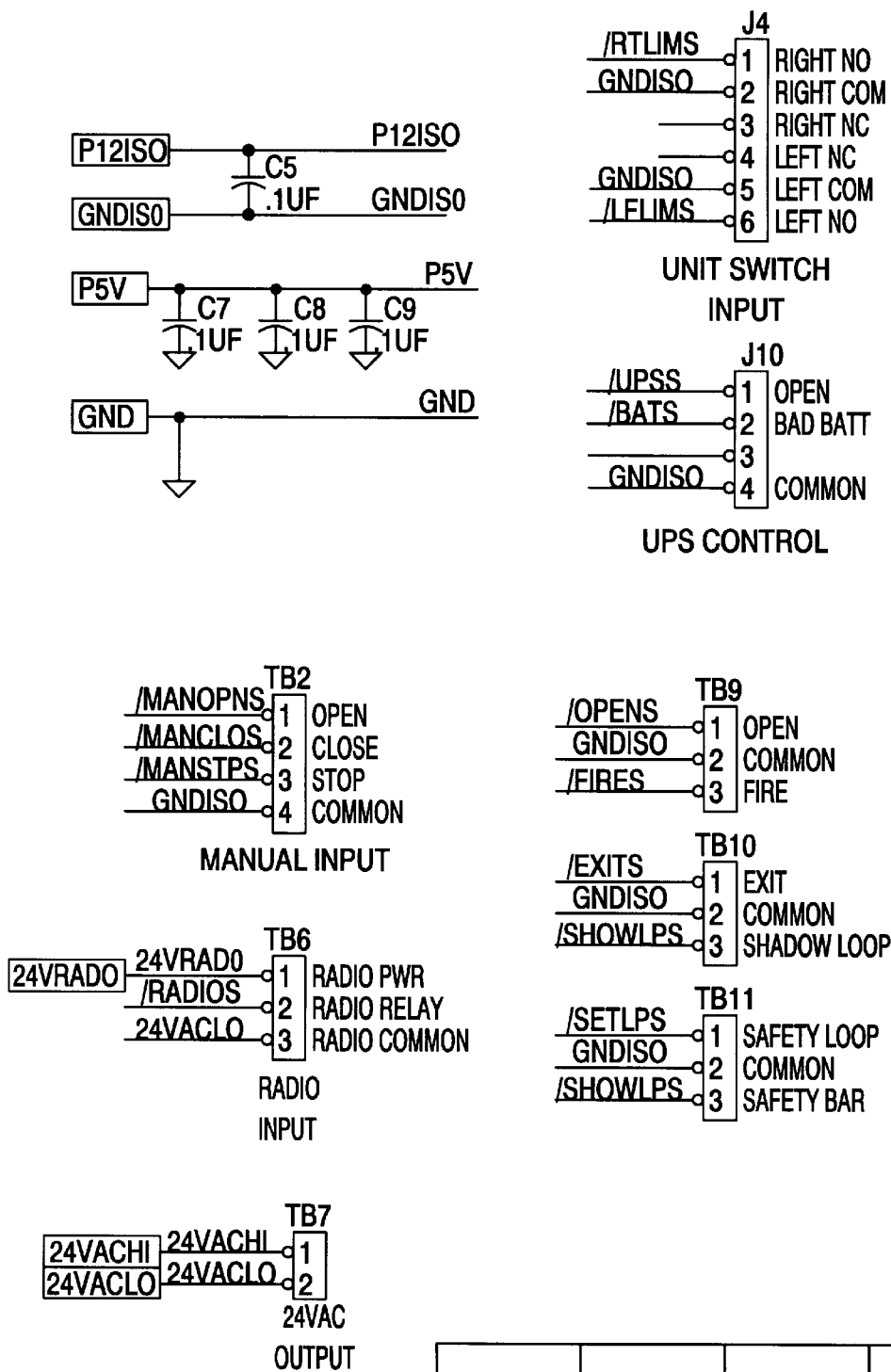
Figure 5B:
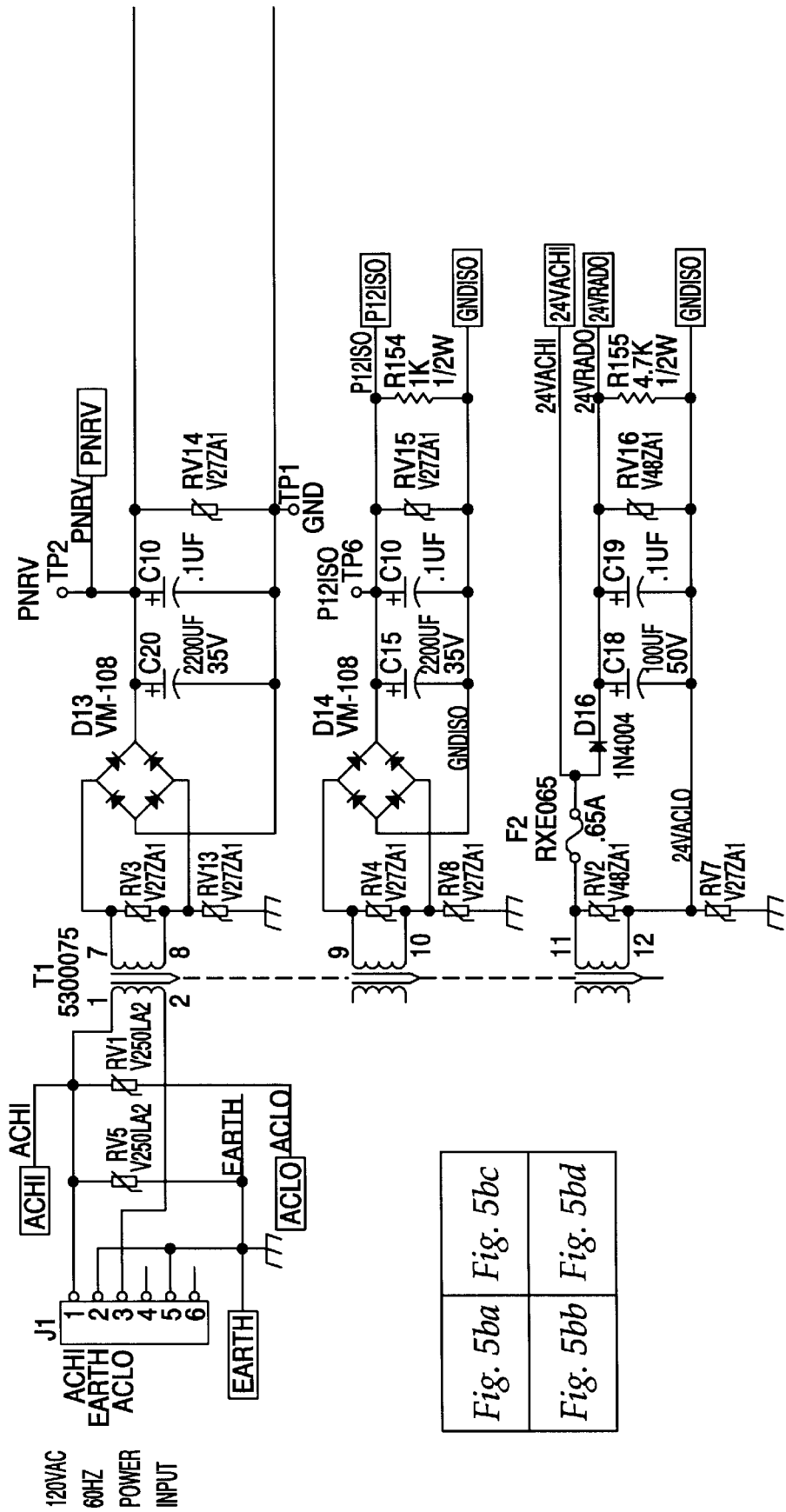
Figure 5B:
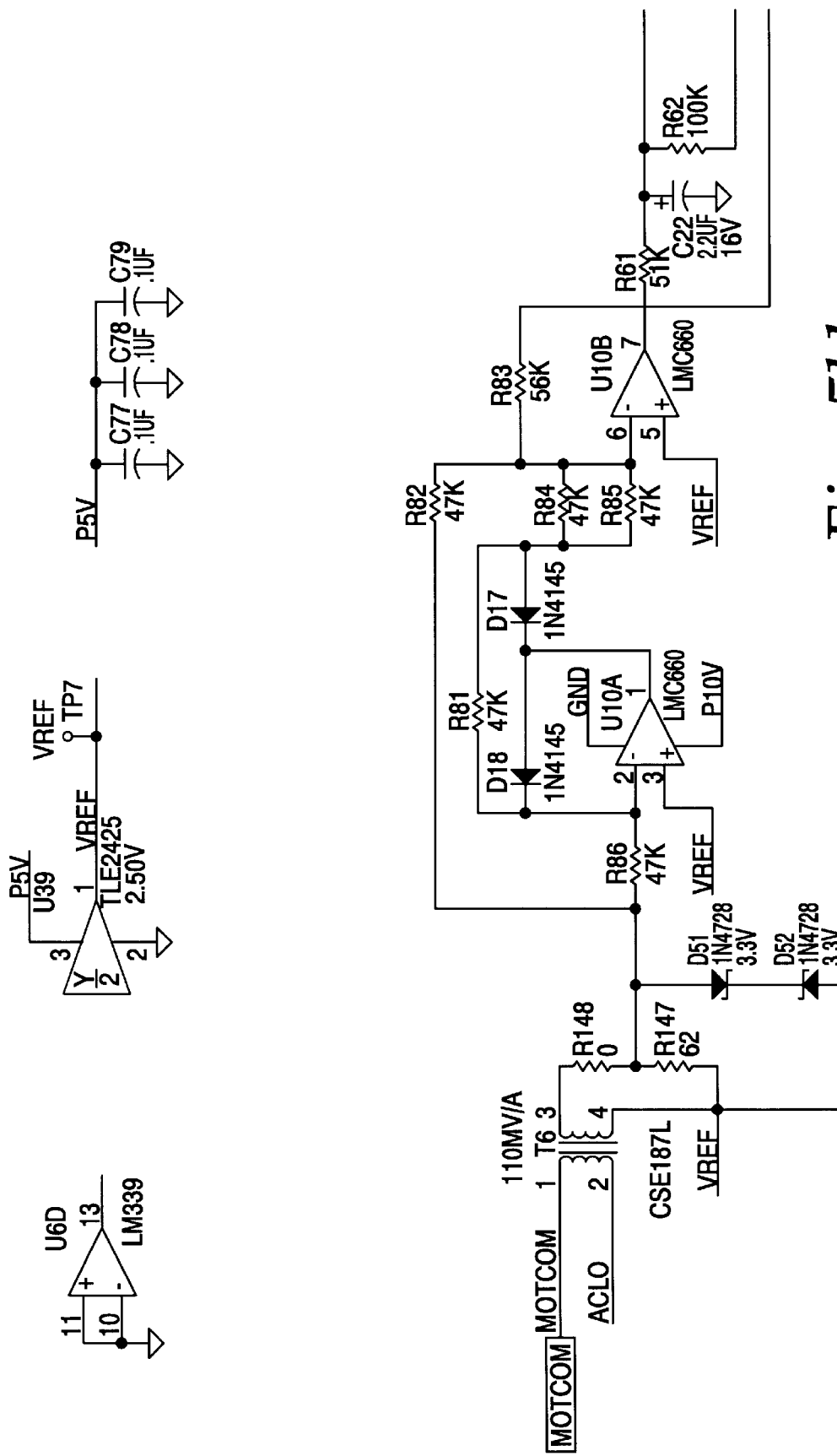
Figure 5B:
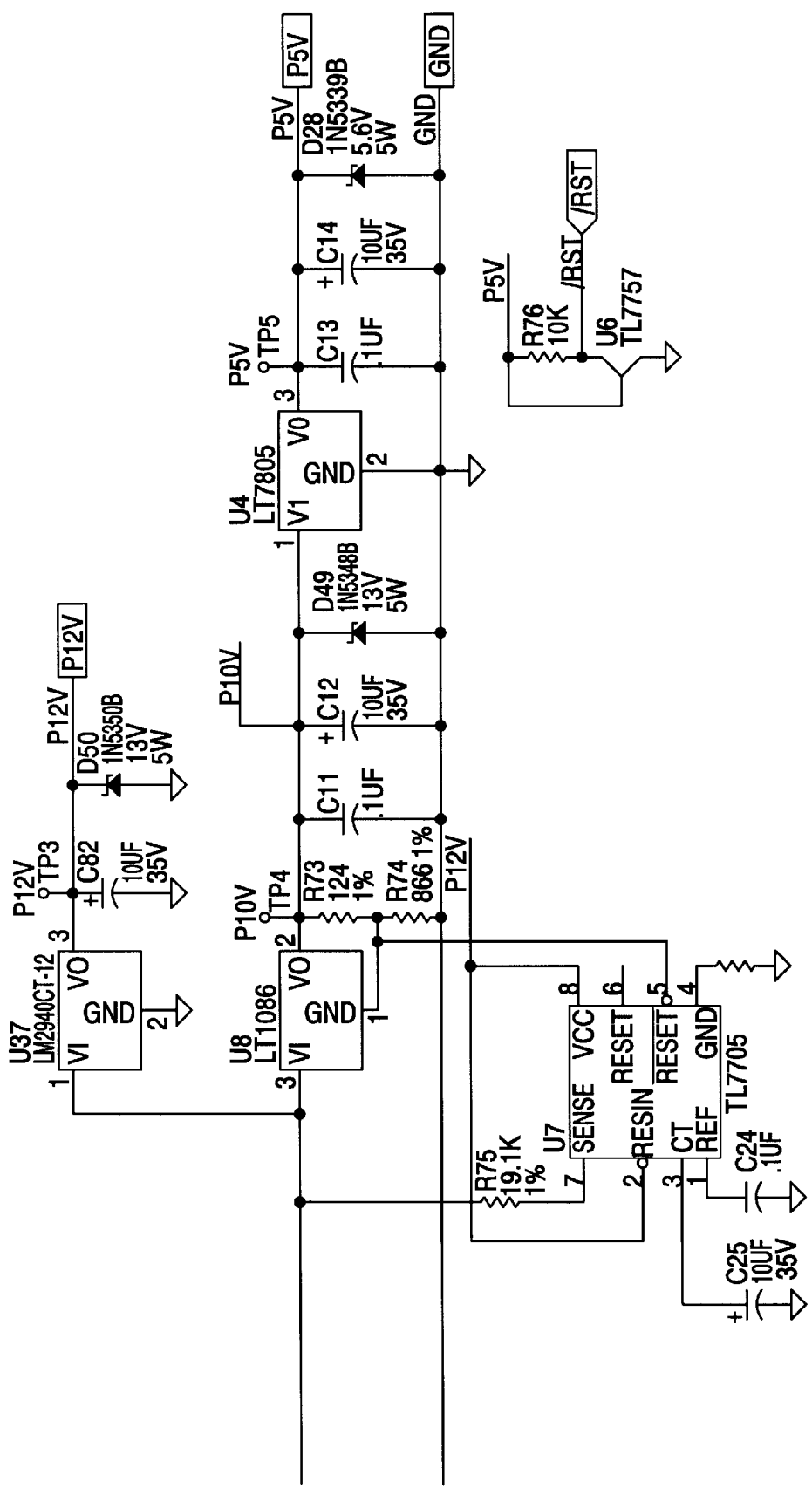
Figure 5B:
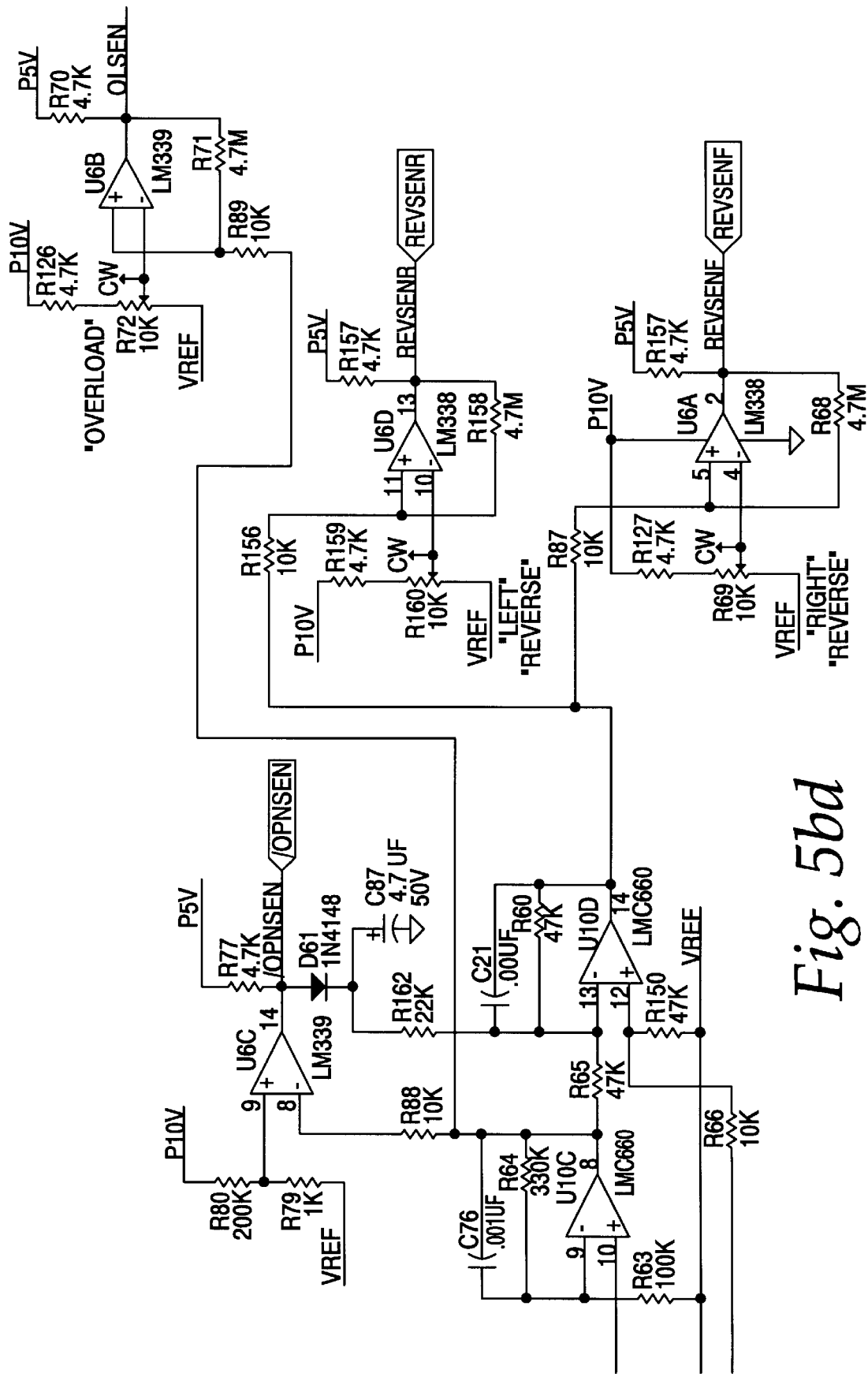
Figure 5C:
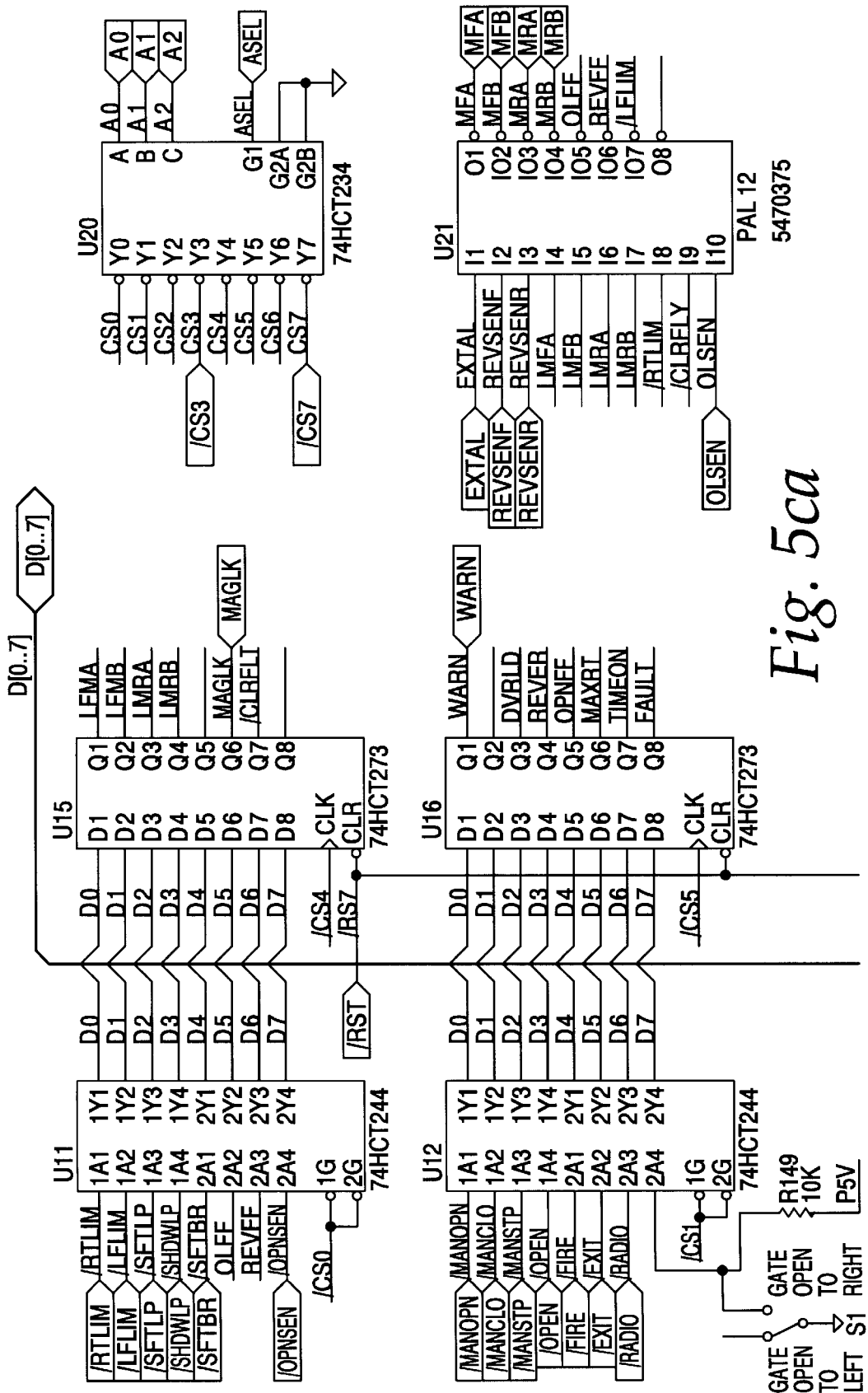
Figure 5C:
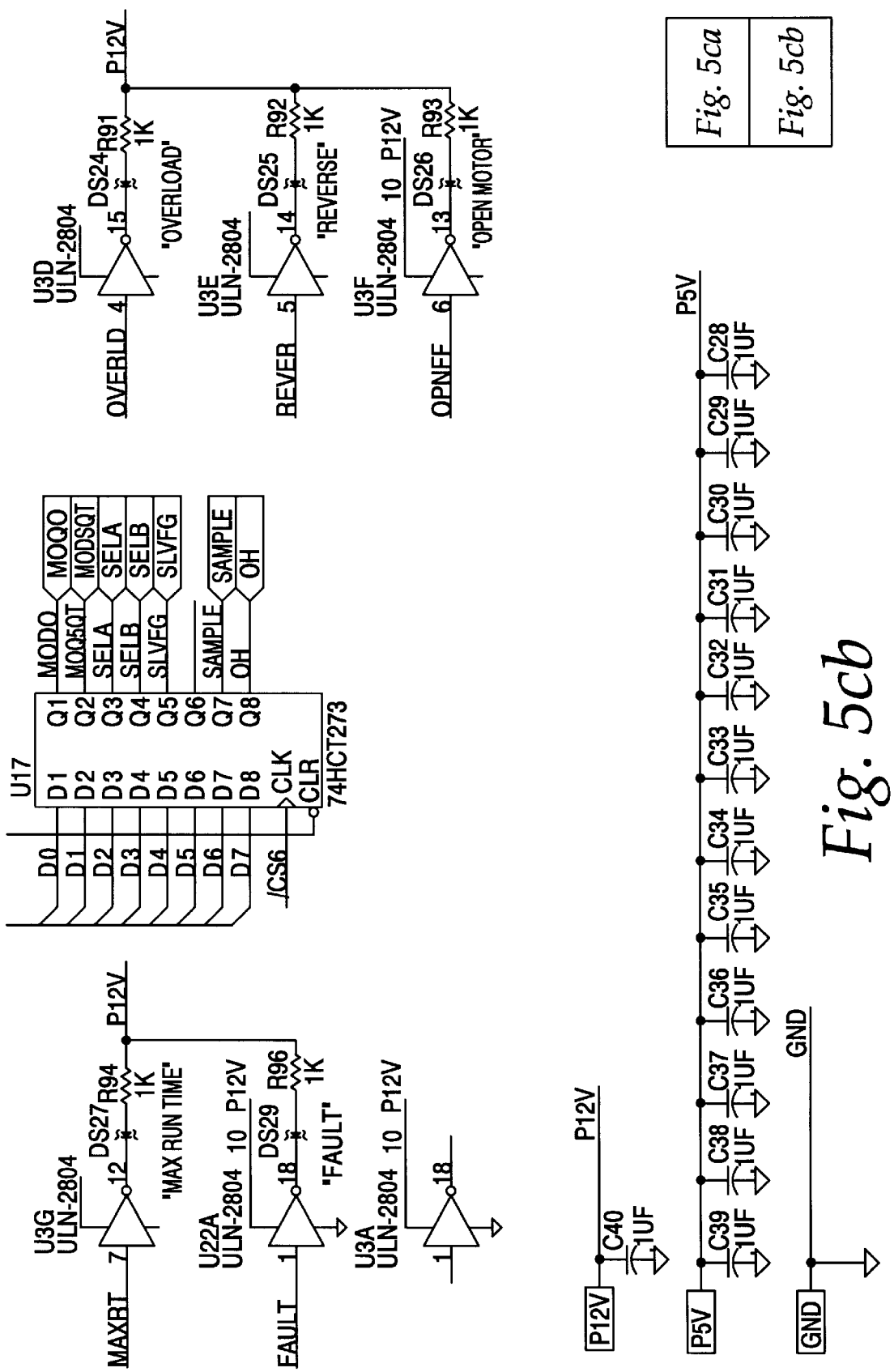
Figure 5D:
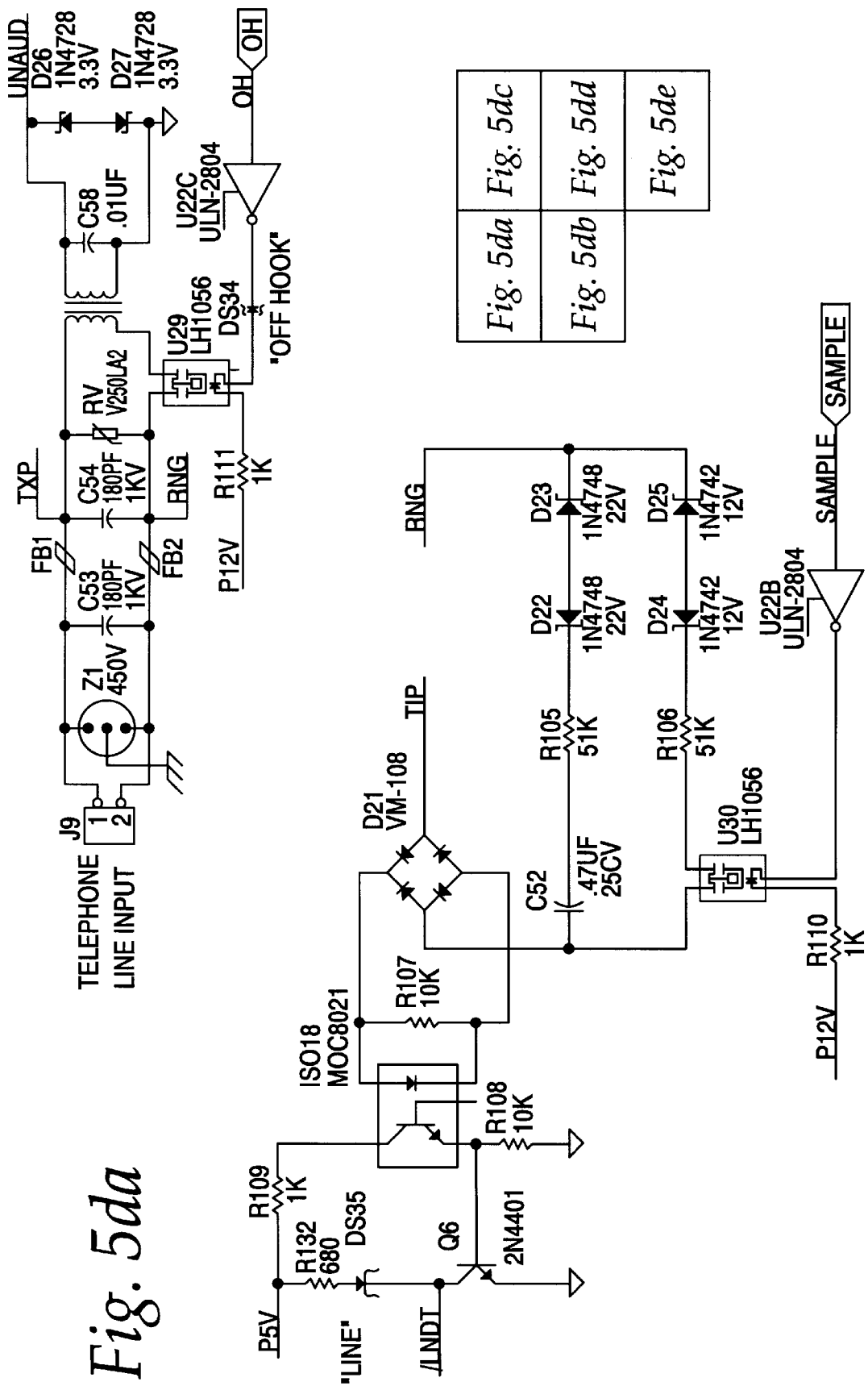
Figure 5D:
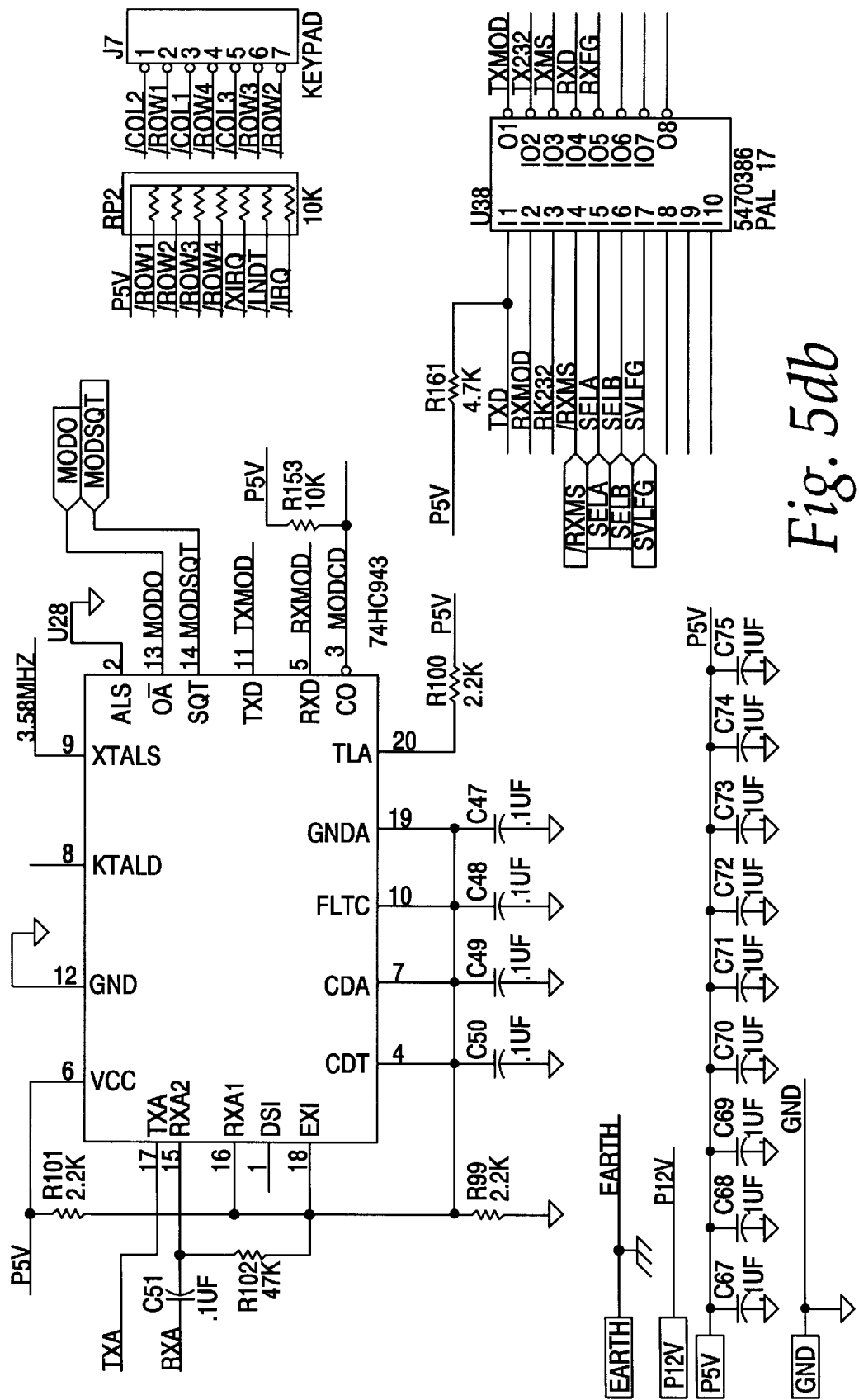
Figure 5D:
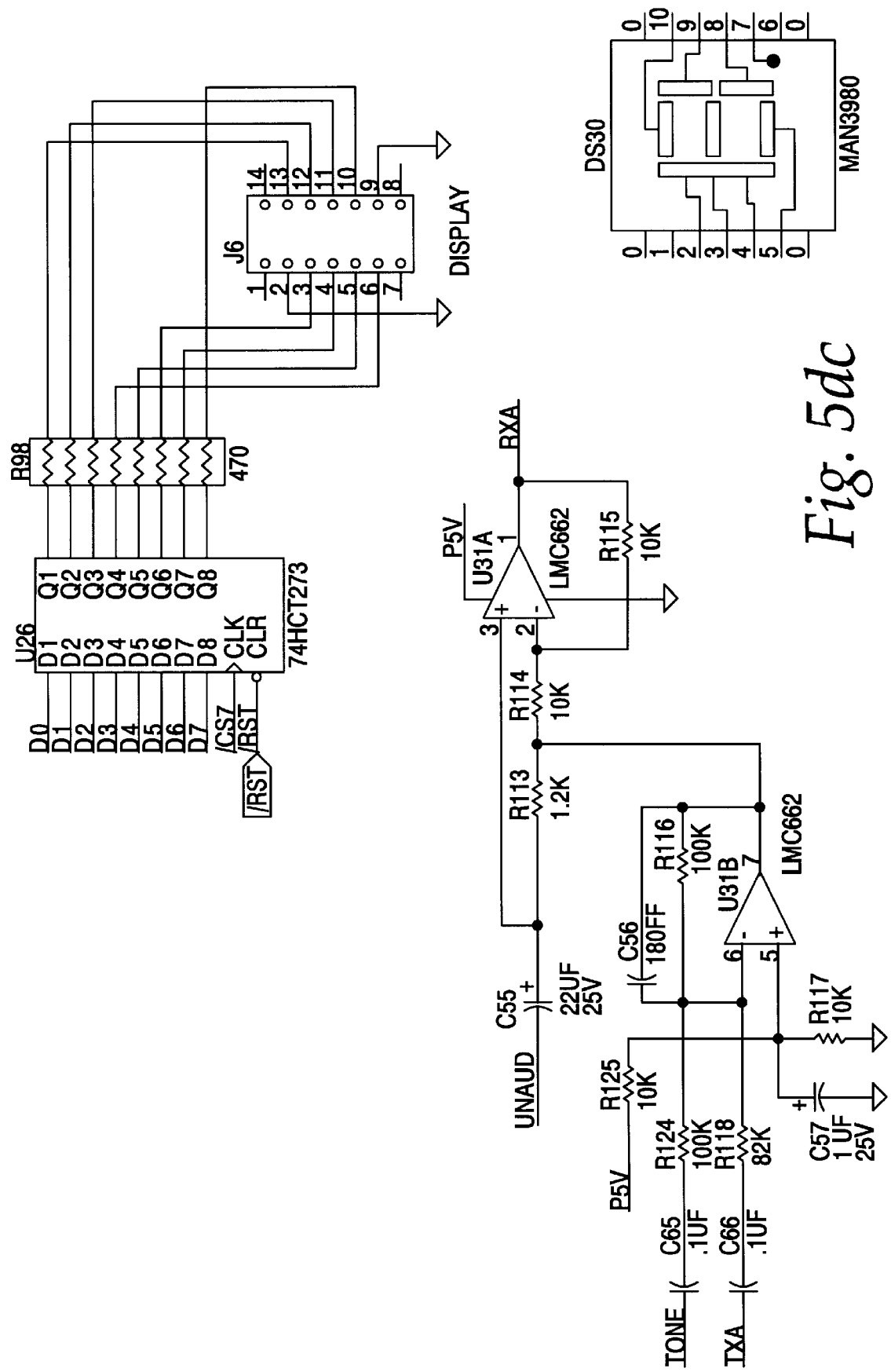
Figure 5D:
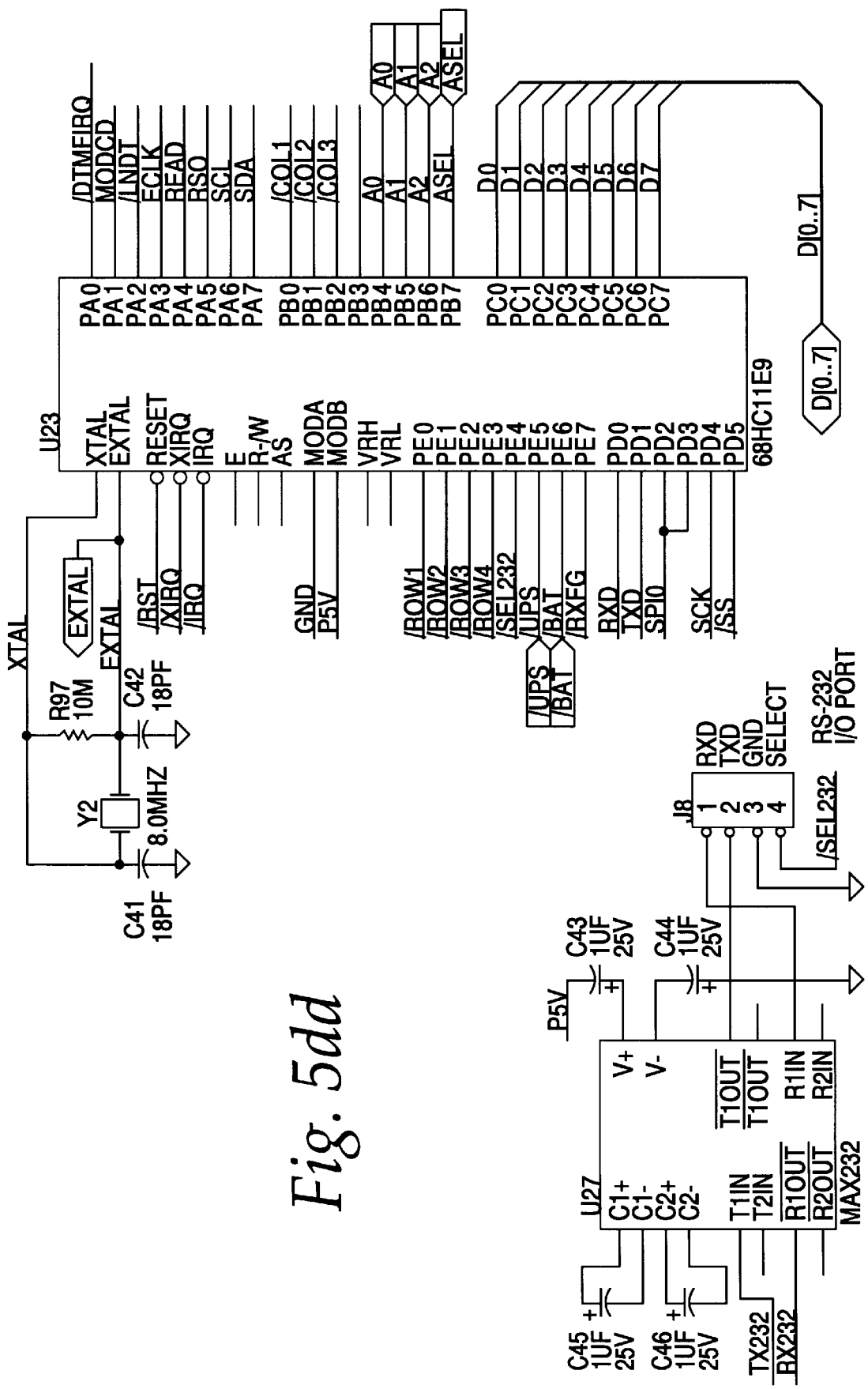

Representative satisfactory selections for the components appearing in FIG. 6 are:

| | |
|---|---|
| R1 | 10 kΩ |
| R2 | 1 MΩ |
| R3 | 100 kΩ |
| R4 | 47 kΩ |
| C1 | 100 pF |
| C2 | 0.001 µF |
| C3 | 0.022 µF |
| D1–D4 | 1N4148. |

If a nearly-linear decrease is desired, in principle more diode pairs and feedback resistors may be added ad infinitum. The greater the number of feedback paths that are used, for a given overall range of input amplitudes, the smaller may be the increments by which the successively-switched-in feedback-resistor values influence the overall change of resistance—and thus the smoother the response.

It will be understood that the foregoing disclosure is intended to be merely exemplary, and not to limit the scope of the invention—which is to be determined by reference to the appended claims.

What is claimed is:

1. A movable barrier operator system, for use in controlling access to a location, comprising:
   a barrier-motor electrical driver;
   a first input device for receiving operating commands for operation of the electrical driver;
   a second input device for developing system status information;
   a memory for storing a record of barrier operator operating commands received and events occurring over a predetermined period of time, said memory also storing information identifying when the commands and events occurred;
   a controller, responsive to received input commands and system status information, for enabling operation of the electrical driver and for storing the received commands and the events occurring in the memory; and
   a remote communications interface coupling the controller and the memory with an outlying location in response to a fault condition, the remote communications interface comprising a remote communications output device for transferring information related to the commands, events and information identifying when the events occurred to the outlying location for review in determining whether the fault has occurred in the movable barrier system or its operation.

2. A movable barrier operator according to claim 1, wherein the remote communications output device comprises a DTMF device.

3. A movable barrier operator system according to claim 1, wherein the remote communications output device comprises a modem for transferring information related to the commands, events and information identifying when the events occurred over a telephone line to the outlying location for review in determining whether the fault has occurred in the movable barrier system or its operation.

4. A movable barrier operator system according to claim 2, wherein the controller, responsive to an event, enables the telephone system for contacting a service provider.

5. A movable barrier operator system according to claim 4, wherein the controller, responsive to enabling of the telephone system for contacting a service provider, downloads the record to the outlying location via a telephone line.

6. A movable barrier operator system according to claim 1, further comprising a circuit for normalizing amplitude of a transient analog tone burst without any transient level overshoot.

7. A movable barrier operator system according to claim 1 wherein the memory is a multiple event memory.

8. A movable barrier operator system according to claim 7, wherein the remote communications output devise comprises a modem for transferring information related to the commands, events and information over a telephone line to the outlying location for review in determining whether the fault has occurred in the movable barrier system or its operation.

9. A movable barrier operator system according to claim 7, wherein the controller, responsive to enablement of the remote communications interface and responsive to an operating command from the outlying location, enables operation of the electrical driver.

* * * * *